(12) United States Patent
Busquets et al.

(10) Patent No.: US 6,262,398 B1
(45) Date of Patent: Jul. 17, 2001

(54) ELECTRICAL COOKING APPLIANCE, IN PARTICULAR DEEP FRYER, COMPRISING A FLAT HEATING ELEMENT WITH SCREEN-PRINTER RESISTOR

(75) Inventors: Jean-Pierre Busquets, Lion-sur-Mer; Bernard Bois, Caen, both of (FR)

(73) Assignee: Moulinex S.A., Cormelles-le-Royal (FR)

( * ) Notice: Subject to any disclaimer, the term of this patent is extended or adjusted under 35 U.S.C. 154(b) by 0 days.

(21) Appl. No.: 09/555,311

(22) PCT Filed: Nov. 20, 1998

(86) PCT No.: PCT/FR98/02547

§ 371 Date: Jul. 17, 2000

§ 102(e) Date: Jul. 17, 2000

(87) PCT Pub. No.: WO99/27829

PCT Pub. Date: Jul. 10, 1999

(30) Foreign Application Priority Data

Nov. 28, 1997 (FR) .................................................. 97 15048

(51) Int. Cl.[7] .................................................. F27D 11/00
(52) U.S. Cl. ............................................................ 219/429
(58) Field of Search ..................................... 219/429, 432, 219/438, 542, 521; 99/330

(56) References Cited

U.S. PATENT DOCUMENTS

| | | | |
|---|---|---|---|
| 3,909,591 | * | 9/1975 | Ulam ..................................... 219/438 |
| 4,527,050 | * | 7/1985 | Kicheerer ......................... 219/448.17 |
| 4,843,218 | | 6/1989 | Husslein et al. . |
| 5,794,522 | * | 8/1998 | Bois et al. .............................. 99/330 |

FOREIGN PATENT DOCUMENTS

| | | | |
|---|---|---|---|
| 3302795 | * | 8/1984 | (DE) . |
| 44 18 239 | | 11/1995 | (DE) . |
| 2 253 551 | | 9/1992 | (GB) . |
| 2316848 | * | 3/1998 | (GB) . |

* cited by examiner

Primary Examiner—Sang Paik
Assistant Examiner—Vinod D Patel
(74) Attorney, Agent, or Firm—Young & Thompson

(57) ABSTRACT

The invention concerns an electrical cooking appliance comprising, in a housing (12), a sheet metal bowl (14) coated on its inner (25) and outer (26) surfaces with a heat-resistant coating, and electrical heating means (16) associated with the bowl (14) and comprising a flat heating element (18) with screen-printed resistor (37). The invention is characterized in that the outer surface (26) of the bowl (14) base (30) has a zone (32) not provided with the coating (28) and on which is directly mounted the flat heating element (18) The invention is applicable to electric deep fryers in particular.

4 Claims, 1 Drawing Sheet

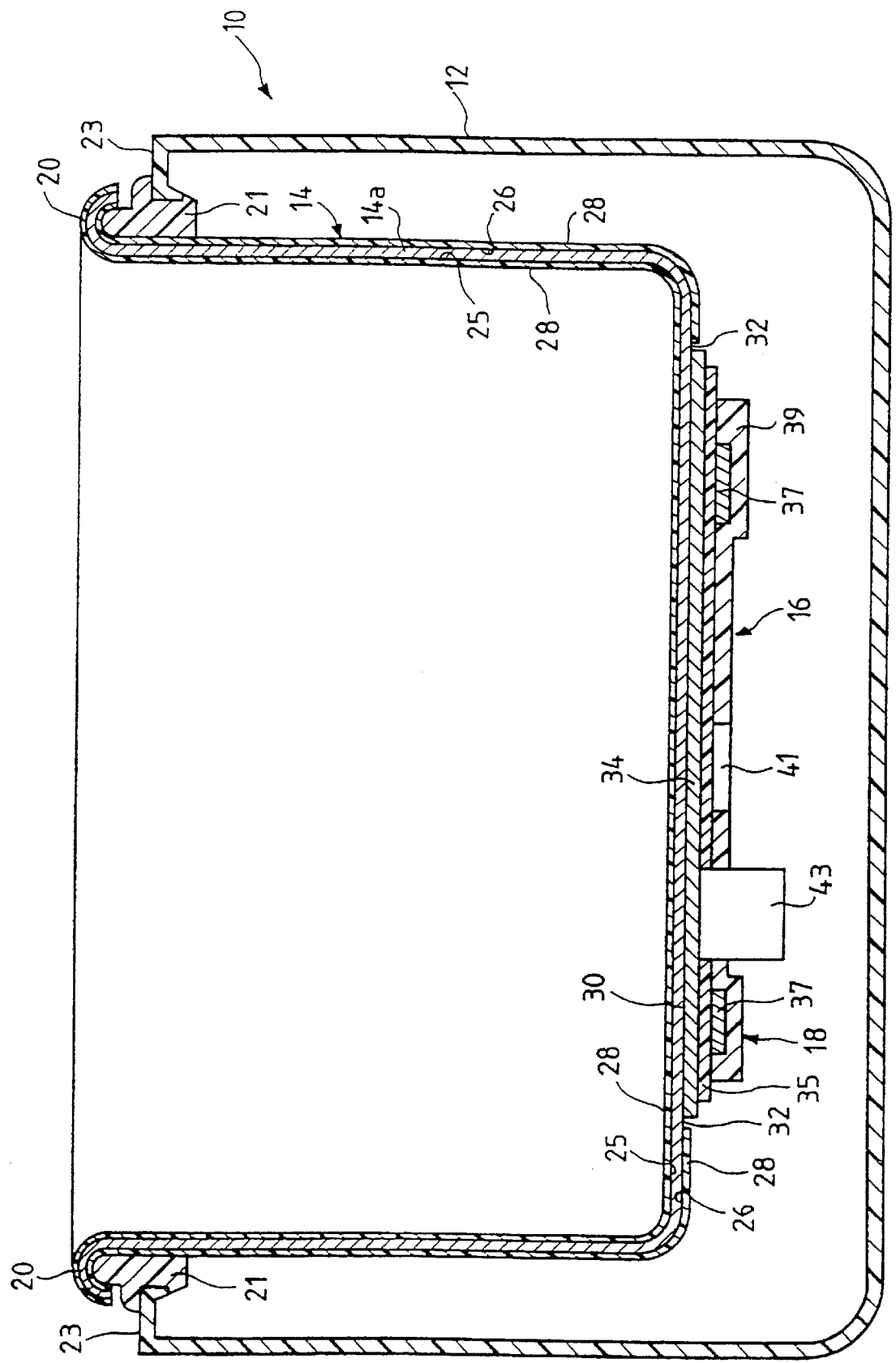

ELECTRICAL COOKING APPLIANCE, IN PARTICULAR DEEP FRYER, COMPRISING A FLAT HEATING ELEMENT WITH SCREEN-PRINTER RESISTOR

The present invention relates to electric cooking apparatus for food which comprises, in a housing, a cooking vat of sheet metal covered on its internal and external surfaces with a heat resistant coating, mounted fixedly or removably, and electrical heating means associated with the vat and comprising a flat heating element with a serigraphically applied electrical resistance.

It is applicable particularly but not exclusively to electric deep fat fryers for cooking, in an oil bath in particular, foods such as fried potatoes, fish or meat.

It is known that for such food cooking apparatus, the cooking vat is generally made by stamping a plate of sheet aluminum or steel, and is then covered internally and externally with a heat-resistant coating, generally of enamel. As is well known, such an enamel coating applied to the internal and external surfaces of the sheet metal cooking vat, whether fixedly or removably mounted in the housing of the apparatus, permits in an advantageous way facilitating the cleaning of the vat, preventing oxidation of the sheet metal, and avoid adherence of foodstuffs to the internal surface of the vat.

In a known cooking apparatus of this type, the flat heating element with serigraphically applied electrical resistance is heated in a cutout provided in the bottom of the enamel sheet metal vat. Although this solution permits overcoming the difficulty remaining to the present time as to the technical drawbacks of serigraphically applying a heating element to a plate or sheet metal, it remains equally complicated and burdensome both as to production of the heating vat and as to the mode of securement of the heating element.

The invention has particularly for its object to overcome these drawbacks and to provide an electric heating element, of the type described above, which will be of simplified design and less costly production, whilst keeping the advantages arising from serigraphically applying the heating element, such as particularly a very rapid increase in temperature of the cooking vat and good homogeneity of the distribution of the temperature of heating.

According to the invention, the external surface of the bottom of the vat has a region which is free of coating and to which is secured the flat heating element.

Thus, the fact of removing the coating of this external zone on the bottom of the vat so as to fix the flat heating element there, hardly changes the production of a conventional sheet metal cooking vat covered internally and externally with this coating, such as an enamel sheet metal vat, and also permit a substantial saving in the material constituting the coating of the vat, in particular for mass production.

According to a preferred embodiment, the flat heating element is connected by welding or cementing on the region free from coating.

The characteristics and advantages of the invention will become more apparent from the description which follows, by way of non-limiting example, with reference to the accompanying drawing, whose single FIGURE is a simplified transverse cross-sectional view of an electric cooking apparatus according to the invention, comprising a flat heating element, on an enlarged scale.

In the embodiment shown in the FIGURE, the electric food cooking apparatus 10 is an electric deep fat fryer, for example of generally rectangular shape, comprising, in a housing 12 made of a plastic material such as for example polypropylene, a rectangular vat 14 mounted fixedly or removably and adapted to contain a cooking bath (not shown) constituted for example by oil, as well as electrical heating means, designated by the general reference numeral 16, associated with the vat 14 and comprising, as will be described in greater detail later, a flat heating element 18 with serigraphically applied electrical resistance.

In a preferred embodiment shown in the FIGURE, the cooking vat 14 is mounted removably in the housing 12, and to this end rests by bearing with its upper peripheral edge 20, on a plurality of supports 21 mounted fixedly on the upper peripheral edge 23 of the housing 12 and made of a thermally insulating material resistant to the temperatures of use during frying.

In the FIGURE, the rectangular vat 14 is a piece of stamped sheet metal 14a, of aluminum or steel, which is covered on its internal surfaces 25 and external surfaces 26 with a coating 28 resistant to heat, such as for example enamel.

According to the invention, the external surface 26 of the flat bottom 30 of the vat 14 has a region 32 which is free from coating 28, hence without enamel in this example, and to which is applied the flat heating element 18.

In a conventional manner, this external non-enameled region 32 is obtained by means of a mask applied during the enameling operation of the interior and the exterior of the vat.

In the embodiment shown in the FIGURE, the non-enameled region 32, which is to say of sheet metal, of the external surface 26 of the bottom 30 of the vat, constitutes the major portion of this external surface 26 of the bottom of the vat 14.

The flat heating element 18 is connected to the external non-enameled region 32 of the bottom 30 of the vat by any suitable securement means, and preferably by welding or cementing.

According to a preferred embodiment shown in the FIGURE, the flat heating element 18 is of small thickness and comprises a plate of stainless steel 34 fixed on the non-enameled external region 32 of the bottom 30 of the vat 14, by means of a layer 35 of electrically insulating material disposed by serigraphy on the plate 34, and by means of a resistive path 37 which is serigraphically applied over almost all the surface of the layer 35 along a pattern of curves fitted within each other, and which is protected by another layer 39 of electrically insulating material applied by serigraphy. There is shown at 41 in the FIGURE one of the two conductive tablets to which is secured one of the two electrical connections (not shown) of the heating element, and which is also applied by serigraphy on the layer 35.

This flat heating element 18 moreover comprises a thermal regulating means 43, such as a thermostat, which is mounted on the internal surface of the plate 34 (in the position shown in the FIGURE) by means of suitable securement means, such as for example screws.

The flat heating element 18 can also comprise several serigraphically applied resistive tracks 37 of different powers which are supplied separately by means of a switching member (not shown) so as to select the suitable heating power according to the type of foodstuff to be cooked.

Thanks to the absence of enamel in the external region 32 of the bottom 30 of the vat 14, the serigraphically applied heating element 18 is therefore fixed in a simple manner to this region 32 and therefore supplies a high localized heating power distributed rapidly and uniformly below the bottom of the vat 14, ensuring a very rapid rise in temperature of the vat. Moreover, the transverse thermal conductivity of the resistance 37 serigraphically applied on the stainless steel plate 34 is very low, which permits advantageously limiting the risk of heating the sidewalls of the vat 14.

There has thus been produced according to the invention an electrical heating apparatus for foodstuffs, in particular a deep fat fryer, which is particularly advantageous not only from the standpoint of its thermal efficiency but also from the standpoint of its simplified design.

What is claimed is:

1. Electric cooking apparatus, comprising, in a housing (12), a sheet metal cooking vat (14) covered on its internal surfaces (25) and external surfaces (26) with a heat resistant coating (28), mounted fixedly or removably, and electric heating means (16) associated with the vat (14) and comprising a flat heating element (18) with serigraphically applied electrical resistance (37), characterized in that the external surface (26) of the bottom (30) of the vat (14) has a region (32) which is free from said coating (28) and on which is secured the flat heating element (18).

2. Apparatus according to claim 1, characterized in that the region (32) of the external surface (26) of the bottom (30) of the vat which is free from coating (28) constitutes the major portion of this external surface (26).

3. Apparatus according to claim 1, characterized in that the flat heating element (18) is secured by welding or cementing on the region (32) free from coating (28).

4. Apparatus according to claim 1, characterized in that it is constituted by a deep fat fryer (10).

\* \* \* \* \*

UNITED STATES PATENT AND TRADEMARK OFFICE
CERTIFICATE OF CORRECTION

PATENT NO.     : 6,262,398 B1
DATED          : July 17, 2001
INVENTOR(S)    : Busquets et al.

It is certified that error appears in the above-identified patent and that said Letters Patent is hereby corrected as shown below:

<u>Title page,</u>
Item [22], "Nov. 20, 1998" should be -- Nov. 25, 1998 --.

Signed and Sealed this

Fourteenth Day of January, 2003

JAMES E. ROGAN
*Director of the United States Patent and Trademark Office*